April 16, 1974   TAKASHI KATO ET AL   3,804,942
AIR PURIFIER

Filed Oct. 26, 1972   3 Sheets-Sheet 1

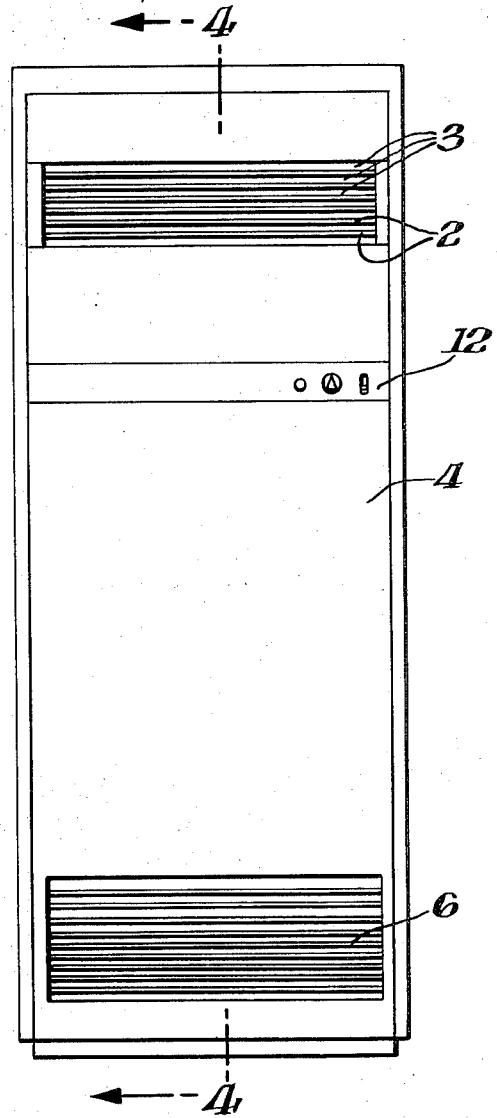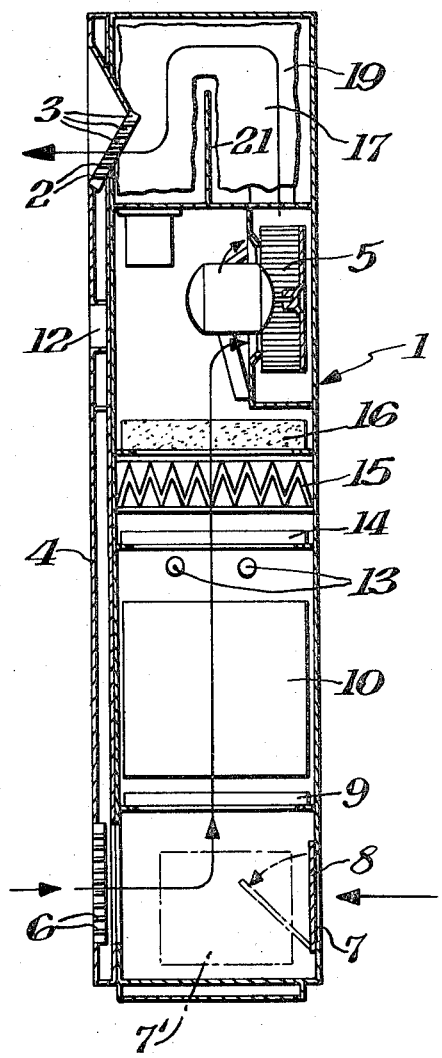

United States Patent Office 3,804,942
Patented Apr. 16, 1974

3,804,942
AIR PURIFIER
Takashi Kato, Machida, Isao Takahashi, Hanno, Kojiro Wakamatsu, Fujisawa, and Yashuhiko Shimizu, Tokyo, Japan, assignors to Shimizu Kensetsu Kabushiki Kaisha and Toyo Kuki Chowa Kabushiki Kaisha Tokyo, Japan
Filed Oct. 26, 1972, Ser. No. 301,152
Claims priority, application Japan, Nov. 16, 1971, 46/91,137
Int. Cl. B01d 50/00, 53/04; B03c 3/01
U.S. Cl. 423—239
10 Claims

ABSTRACT OF THE DISCLOSURE

An air purifier includes structure for eliminating various forms of dust, fumes, mist, microbes, gas and odor from polluted air by passing the polluted air through a succession of different filters arranged within a casing. A prefilter removes coarse dust while an electrostatic dust collector removes fine dust whereby all the pollutants from virus to coarse dust are physically eliminated leaving only harmful chemical gases. An ion-exchange resin filter or an oxidization catalyst filter change the remaining gases into stable salts or into a form easily adsorbable on active carbon. Activated carbon may be used as the final filter.

BACKGROUND OF THE INVENTION

The present invention relates to an apparatus for purifying polluted air, and more specifically to an all-round air purifier that removes all the pollutants harmful to the health of people working or living indoors.

It is common knowledge that the air is indispensable for our daily life and contains by volume ratio about 78% nitrogen, 21% oxygen, 1.0% argon, and 0.04% carbonic gas. Also, it contains fine dust which naturally occurs. With the progress of farming and other industries, and with the growth of the economy, culture and traffic, air becomes contaminated with the wastes of urban life which are artificially generated and are detrimental to the human body.

Although it depends upon the locality, the typical air pollutant is the smoke generated from industrial zones and other places. This smoke contains various organic and inorganic substances, such as fine particles of 0.01–1.0 micron in size which are generated through imperfect combustion of carbon compounds, for example, anthracene, pyrene, aromatic hydrocarbons, various sulphur oxides, nitrogen oxides, hydrogen fluorides, and chlorides.

These pollutants are present in the form of solid dust sublimates resulting from vaporization at high temperature of combustion followed by cooling, fumes of fine solid particles distilled and condensed, mist of fine grains produced through atomization of liquid, and gases generated chemically, for example, by heating and activation. Their chemical compositions are commonly sulphur dioxide ($SO_2$) resulting from combustion of carbonized substances such as heavy oil, various forms of nitrogen oxides such as $N_2O$, $NO$, $NO_2$, $N_2O_5$, hydrogen fluoride (FH) compounds, and ozone ($O_3$).

Auto emission is one of the air pollutants, but the fuel which is the origin of this emission differs depending on the type of crude oil and the method of refining. Commercial gasoline usually is composed of various hydrocarbons with different structures such as aromatic hydrocarbon, olefine, paraffin, isoprapaffin, naphthene. Recently, commercial gasoline has various additives blended into it for the purpose of raising the compression ratio and improving the performance of smaller engines. These additives include anti-knock agents that improve the octane number and prevent detonation, such as tetraethyl lead, tetrachloride lead, ethylene bromide, trichlodin phosphate, boron-containing ester; and antioxidants such as boron-containing ester, phenolic compounds. Under high pressure and high temperature within the engine cylinders, these additives are oxidized and chemically transformed into carbon monoxide, nitrogen oxides, hydrocarbons, hydrogen nitride, and aldehyde. These emissions, together with other composite product discharges such as lead chloride, lead bromide, ammonia chloride and potassium bromide, pollute the air. Moreover, these pollutants are generated in heaviest concentrations at starting, acceleration and deceleration of automobiles in areas of busy traffic.

Additional sources of pollution include trichloroethylene vapor produced at laundries; hydrocarbon gases, powder, dust, mist, hydrocarbon substances, naphthalene ($C_{12}H_8$), methane gases produced at printing shops, painting shops, newspaper presses or on site construction and asphalt pavement work; organic chloride, hydrocarbon, ammonia compounds originating from ink, carbon paper and copying machines at offices or workshops; odors of perspiration, and other human body secretions (urine, valerianic acid, ammonia, etc.); and odors of pyridine and nicotinic acid derived from smoking. Some of these substances, when combined with local environments such as light waves, heat, high tension power transmission lines or sparks from the pantograph of electric trains, occasionally cause various chemical reactions. For instance, photochemical reactions, i.e., the transformation of matter by the effect of light energy, is mainly caused by the ultraviolet rays of short wavelength in a sunbeam and the radio wave of a short wavelength such as leakage from the high tension power transmission lines, mercury vapor lamps, neon signs, fluorescent lamps in the street, and regardless of indoors or outdoors, it results in a decomposition and combination of substances.

A few examples are cited as follows:

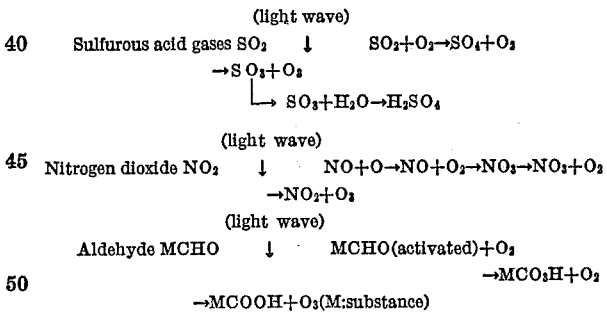

The above are but a few examples, and in reality various other chemical reactions between numerous substances occur in the atmosphere.

In summary, the atmosphere holds a great variety of chemical substances in different states and its composition is quite complex with some of these substances which are still unstable being in the process of chemical change and even the same gases being polar in some cases and non-polar in others.

Conventionally, gaseous particles have been eliminated by an activated carbon filter while relatively big particles in the order of over 5–10 microns in diameter have been removed by a filter made of a collection of fibrous substances. Relatively small particles over about 0.01 micron or bacteria, viruses and tobacco smoke have been physically eliminated by an electrostatic dust collector. As a chemical filter, the ion-exchange resin has been available, but its main use has been an exchange of ions in a liquid and its application to gases has been rare. Now, effective and efficient purification of the air thus polluted is beyond the ability not only of a single filter but even of a combination of different filters corresponding to respective pollutants.

SUMMARY OF THE INVENTION

The primary object of the present invention is to provide an all-round air purifier that efficiently supplies a purified air devoid of all obnoxious, harmful and odorous pollutants through the synergistic effect of a new combination of a group of various filters that capture different pollutants with different chemical compositions, such as dust, mist, fumes, and a chemical filter for removal of gases.

Another object of the present invention is to provide an all-round air purifier characterized by a series of filters being installed in the air path of a casing in which an electrostatic dust collector causes the ozone generated through high voltage discharge to act upon the air thereby promoting the chemical reaction of harmful gases and thus facilitating their disposal in a chemical filter.

In accordance with the present invention an air purifier is provided for purifying dust-laden air comprising a casing having an air intake for introducing polluted air into the purifier and an air outlet for supplying purified air from the purifier. A blower in the casing functions to circulate air therethrough from the intake to the outlet, and the air successively passes through a series of filters. The filters include a pre-filter for removing coarse dust, and an electrostatic dust collector for impressing the dust with a high voltage and thereafter collecting the dust thus charged. A grounded metallic filter is provided for absorbing the charged dust, and a chemical substance-capturing filter causes a chemical reaction in the chemical components of the charged dust to thereby adsorb and remove the chemical components. Finally, an activated carbon filter adsorbs airborne inorganic and organic substances and colloidal particles.

The present invention also includes the method of purifying polluted air by successively passing the air through a series of filters of the above described type.

BRIEF DESCRIPTION OF THE DRAWINGS

Novel features and advantages of the present invention in addition to those mentioned above will become apparent to those skilled in the art from a reading of the following detailed description in conjunction with the accompanying drawing wherein:

FIG. 3 is a front elevational view of another air purifier, according to the present invention;

FIG. 4 is a sectional view taken along line 4—4 of FIG. 3;

DETAILED DESCRIPTION OF THE INVENTION

Figure 1:
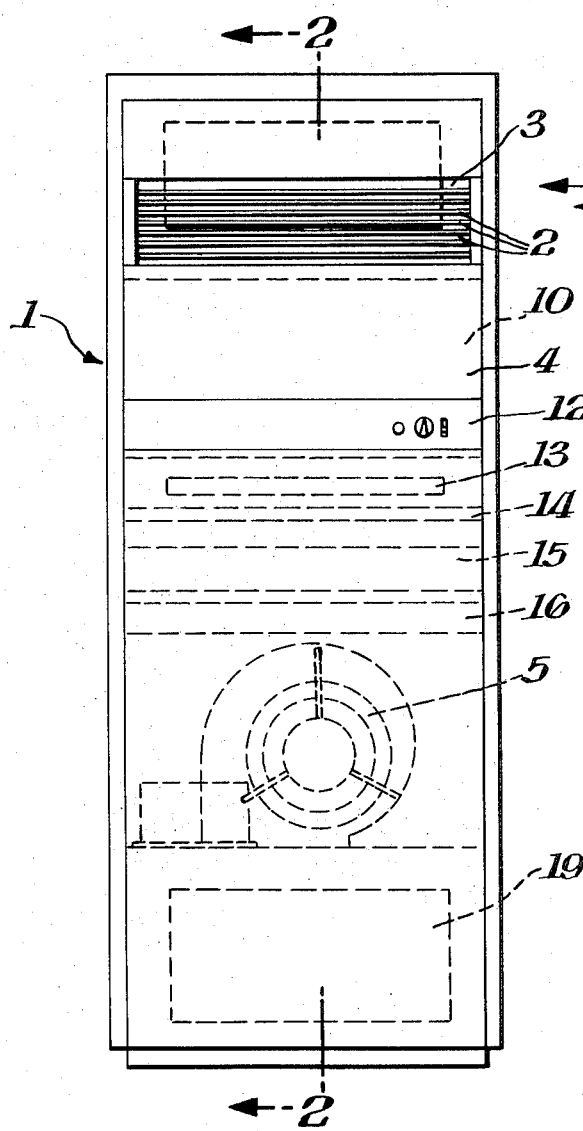
FIG. 1 is a front elevational view of an air purifier, according to the present invention.
Figure 2:
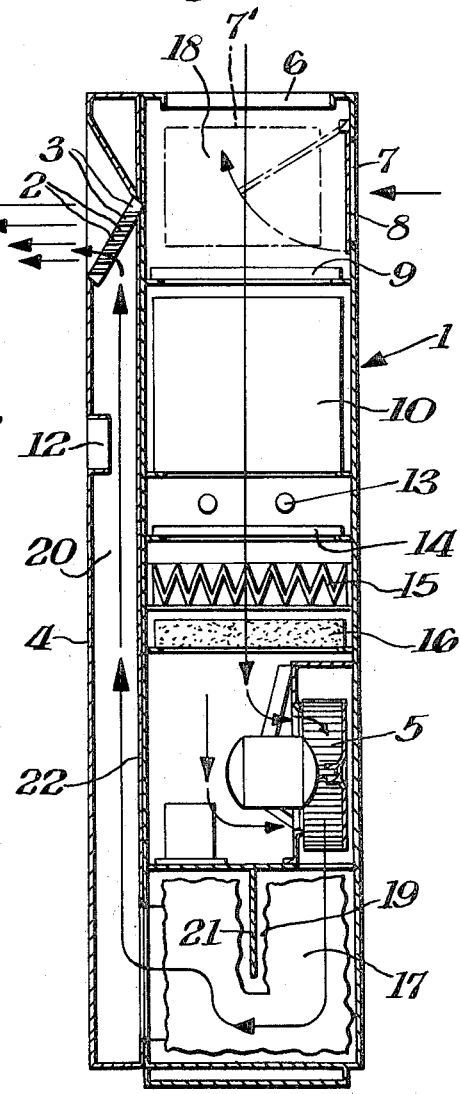
FIG. 2 is a sectional view taken along line 2—2 of FIG. 1.

Referring in more particularity to the drawing, the embodiment of the invention illustrated in FIGS. 1 and 2 includes a blower 5 close to the bottom inside the apparatus within a box-like cylindrical casing 1 having a rectangular cross section. An air intake hole 6 is provided at the top surface of the casing 1. A series of installations are arranged in the air passage between the intake hole 6 and the blower 6. These installations include an air intake chamber 18, a first filter 9 that removes coarse dust or more than 5–10 microns, a second filter 10 in the form of an electrostatic dust collector that removes fine particles of over 0.01 micron, a germicidal lamp 13 which irradiates the dust collection board of the electrostatic dust collector with ultraviolet rays, a third filter 14 in the form of a metallic filter which is grounded, a fourth filter 15 in the form of a chemical filter which is either an ion-exchange resin filter or an oxidation catalyst filter, and a fifth filter 16 comprising activated carbon. A sound-absorbing chamber 19 lined with acoustic material 17 is set in the air passage downstream of the blower. At the front of the casing 1 a flattened cylindrical lid 4 with a flat rectangular cross section is provided. A purified air outlets opens close to the top of the lid 4. The inside of the lid 4 constitutes an air passage 20. Around the rear side of the lid 4 a rubber seal 22 is provided. The rubber seal has a built-in magnet so that the lid 4 tightly adheres to the surface of the casing 1. The air leaving the sound-absorbing chamber 19 rises through the air passage 20 so that purified air is supplied to the outside through the outlet 3.

Details of each of the installations mentioned above are as follows.

In the air intake chamber 18 an intake hole 6 opens at the top surface while another intake hole 7 is provided at the side surface. These intake holes are equipped with a damper 8 to control the volume of air intake. The chamber has such a structure 7' in which additional air intake holes may be provided, if desired. Knock-out notches or holes are located in the structure 7' so that additional intake holes can be provided when they are needed.

The coarse dust filter 9 consists of a chemical molded product, synthetic fibers, glass fibers and a metal screen, so that it removes coarse dust of more than 5–10 microns.

Figure 5:
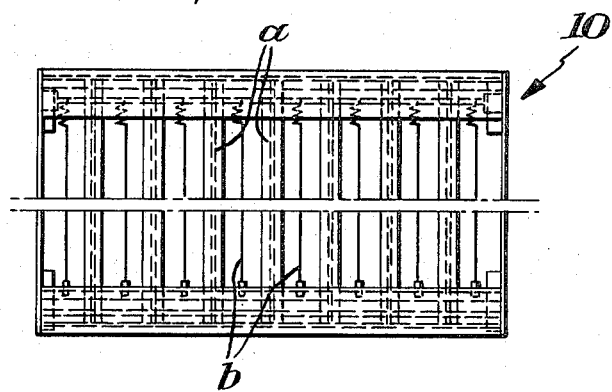
FIG. 5 is a front elevational view of the ionization device in the electrostatic dust collector, according to the present invention.
Figure 6:
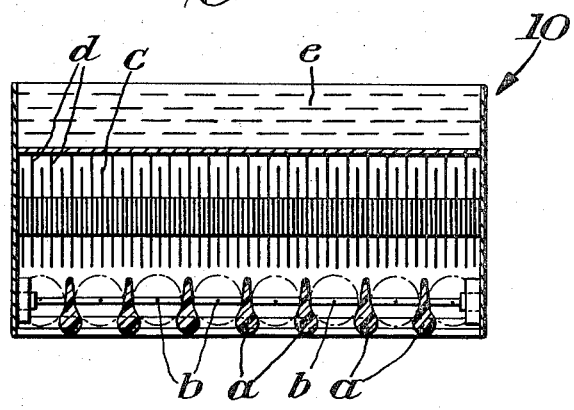
FIG. 6 is a plan view of the electrostatic dust collector, according to the present invention.

The electrostatic dust collector 10 is illustrated in FIGS. 5 and 6. A cathode $a$ which looks like a column with a pear-like cross section and a high tension discharge wire $b$ made of tungsten of less than 0.8 mm. in diameter are horizontally arranged in alternating fashion. Directly above this arrangement and downstream of the air flow an alternate arrangement of an induction-charged plate $c$ which floats above the ground and a grounding plate $d$ are provided. Atmospheric dust of over 0.01 micron and other particles which float in the air with this dust as a nucleus, such as gas particles, bacteria, viruses and tobacco smoke are collected or adsorbed on these plates. Meanwhile, the passing medium (gas, liquid or solid) is activated through high tension discharging and at the same time a small amount of ozone ($O_3$) is generated.

Germicidal lamp 13 radiates ultraviolet rays more than 60 times that of a sunbeam. It is so positioned as to be able to irradiate the dust collection board $e$ of the electrostatic dust collector 10. This irradiation with ultraviolet rays changes the nature of the passing medium and activates it.

Metallic filter 14 consists of copper wool, aluminum foil, etc. It is grounded so that the plus-charged dust, which has failed to be captured, may be adsorbed. Also, it neutralizes the plus ions which have passed through the electrostatic dust collector and at the same time it reduces the ozone ($O_3$) resulting from metal oxidization to $O_2$.

Chemical filter 15 collectively refer to the ion-exchange resin filter and the oxidization catalyst filter. The ion-exchange resin filter permits the use of ion-exchange resin with both the natures of anion and cation, for instance,

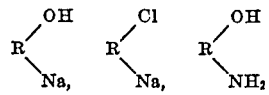

It is constituted by impregnating a non-woven cloth with ion-exchange resin and forming the cloth with corrugations so that the velocity of a passing air flow is reduced; or by giving the cloth a granulated structure or a cylindrical form and laminating many of these cloths together; or by producing a textile of ion-exchange resin, making wool-like and binding many of them with a porous binder to produce a non-woven cloth filter; or by cutting ion-exchange resin into small pieces and molding these pieces with a porous binder. The conventional use of ion-exchange resin has been mainly as an ion-exchanger in a solution, but in the present invention the resin is being utilized as an ion-exchanger in a gas.

The oxidization catalyst filter consists of manganese dioxide ($MnO_2$), copper oxide ($Cu_2O$) and ferric oxide ($Fe_2O_3$) which have been activated through high temperature-high tension discharging or by using calcium carbide. If necessary, a heavy metal oxide such as cobalt oxide (CoO) may be added. This filter is formed as a non-woven cloth impregnated with fine powder of mixed chemicals and corrugated, or as a sphere or cylinder formed by a blend of oxidization catalyst.

The activated carbon filter 16 is composed of *Fagus crenata*, oak wood or seeds in fruits which have been carbonified and activated at 600–700° C. which are effective for the adsorption of non-polarized substances such as carbon dioxide ($CO_2$), carbon tetrachloride ($CCl_4$), hydrocarbon ($CnH_{2n+2}$, $CnH_{2n}$, $CnH_{2n-2}$), in which the moments of individual ions cancel each other, though the substances are nonpolar, that is, their molecules are individually chemical bonds. The activated carbons are formed as grains or a cylinder.

The purified air outlet 3 is equipped with an air flow control plate 2. Item 12 is an operating board and 21 is a partition wall.

Such being the composition of this embodiment, when the blower 5 starts, the air is sucked in through the intake hole 6 of the air intake chamber 18 and also, flows through the hole 7 at an adequate flow rate controlled by the damper 8. In the coarse dust filter 9, coarse dust of more than 5–10 microns is eliminated. Then, the electrostatic dust collector 10 efficiently adsorbs the atmospheric dust of over 0.01 micron and other particles which cling to this dust or float in the air with this dust as the nucleus, such as gases, bacteria, viruses and tobacco smoke. The adsorbed particles being electrically attracted and concentrated remain deposited on the dust collection board without flying away. Meanwhile, a small amount of ozone is generated through high tension corona discharge in the electrostatic dust collector 10. Part of the ozone kills microbes attached to the dust collection board while at the same time it activates the passing medium. Also, as described in detail below, the ozone promotes the efficiency of an ion-exchange resin filter, if one is employed.

The germicidal lamp 13 is installed downstream of the electrostatic dust collector 10. The germicidal lamp 13 irradiates and destroys the microbes deposited on the dust collection board. Thus, some of the pollutants are activated by the light waves from the lamp 13.

The metallic filter 14, being metallic and grounded, adsorbs the plus-charged dust which has not been captured. Also, it neutralizes the plus-ions which have passed through the electrostatic dust collector, and at the same time reduces the ozone ($O_3$) to $O_2$ through oxidization.

Pollutants, mainly gaseous ones which have escaped the above-mentioned filters, are captured by the chemical filter 15. If it is an ion-exchange resin filter, the poisonous gases of $SO_2$ or $NO_2$ can be transformed into stable salts through ion-exchange as well as the effect of moisture content in these gases. If it is an oxidization catalyst filter, this filter can turn CO to $CO_2$, $NO_2$ to $NO_3$ and $SO_2$ to $SO_3$ so that these gases may be easily adsorbed by the activated carbon filter located downstream. Moreover, the filter can combine them with heavy metals of a catalyst and keep them therein.

In the activated carbon filter 16, nonpolar substances such as carbon dioxide, carbon tetrachloride and hydrocarbons are vigorously absorbed or adsorbed. Activated carbon is internally criss-crossed with macro pores $10^{-8}$-$10^{-5}$ cm. in diameter and micro pores $10^{-8}$-$10^{-6}$ cm. The internal surface areas of these pores are approximately equal to 500–2000 m.$^2$ per 1 g. Thus, non-polar gases and odors are perfectly absorbed into these pores.

The noise from the blower is adsorbed in the sound-absorbing chamber 19. Completely purified air is sent through the duct 20 of the lid 4 out of the outlet 3 with the inclination of the air flow control board 2 so adjusted as to direct the air flow toward the inhaling line of the occupants in the room.

The essentials in the concept of the present invention are as follows. Coarse dust in the atmosphere is captured and eliminated in the first filter which consists of the coarse dust filter 9. The dust or mist over 0.01 micron or the floating gases, bacteria and viruses with the dust or mist as a nucleus are captured and eliminated in the second filter which consists of the electrostatic dust collector 10. In the dust collector 10, high tension discharge produces ozone ($O_3$) which plays a vital role as described below. In this manner, the atmosphere is physically deprived of all particles from viruses to coarse dust and now, only the chemically harmful gases are left in the air.

The chemical filter disposes of these harmful gases. In the case of this filter being an ion-exchange resin type, at first the ion-exchange resin acts as an oxidization catalyst, causing the following chemical reaction:

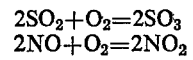

whereby the poisonous gases, such as sulfurous acid gases and nitogen monoxide are changed to sulphur trioxide and nitrogen dioxide. Moreover, about 30–45% water content of the resin disolves the above-mentioned $SO_3$, $NO_2$, $MCO_3H$ and turns them into sulphuric acid, nitric acid and nitrous acid as follows:

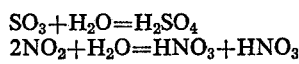

Only then can the resin come into play (for instance,

and through its ion-exchange action, stable salts are produced as follows:

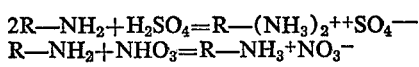

If any part of $SO_2$, NO passes on without being oxidized into $SO_3$, $NO_2$, it will all be captured in the activated carbon filter. In the case of the filter being an oxidization catalyst type, the heavy metals contained in the filter itself are combined with the poisonous gases and the latter are absorbed. Also, the filter changes carbon monoxide, nitrogen monoxide and sulfurous acid gases as follows:

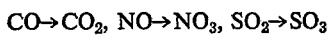

so that they can be easily absorbed by the activated carbon filter. The activated carbon filter absorbs CO, NO, $SO_2$ with difficulty, but can absorb $CO_2$, $NO_3$, $SO_3$ with ease.

According to the present invention, the electrostatic dust collector is located upstream of the chemical filter 15. Therefore, the ozone ($O_3$) generated in this collector acts as follows and invariably produces $SO_3$, $NO_3$,

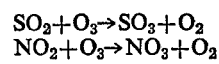

even if part of the $SO_2$, $NO_2$ fails to be turned into $SO_3$, $NO_3$ through the catalyst action of the ion-exchange resin—in the case of the chemical filter being an ion-exchange resin one. Thus, since all of the $SO_3$, $NO_3$ can be dissolved in the water contained in the ion-exchange resin, the air-purifying effect is even more intensified.

The metallic filter 14 is provided to adsorb the plus-charged dust which has not been captured and to neutralize the plus-ions. The germicidal lamp 13 is provided to guarantee perfect sterilization.

The apparatus illustrated in FIGS. 1 and 2 is a top suction-type while the one shown in FIGS. 3 and 4 is a bottom suction-type. Selection depends upon the natural circulation of indoor air and the environmental conditions. In FIGS. 2 and 4, similar parts are identified by similar reference characters.

Such being the composition of the present invention, the air purifier according to the present invention eliminates all of the substances polluting the air, such as dust, fumes, mist, microbes, gases and odors. This is accomplished in a highly efficient manner through a unique combination and orientation of different filters. Further, as illustrated in the embodiment of FIG. 2, when the air passage is constituted by the lid 4 covering the front of the casing 1, the maintenance, inspection of the internal devices and renewal or replacement of their parts is easily accomplished.

What is claimed is:

1. A method of eliminating various pollutants contained in air such as dust, fumes, mist, microbes, gases and odors by introducing polluted air through an air intake into a casing and successively charging the air through a group of filters as follows: a pre-filter to remove coarse dust, an electrostatic dust collector to impress the dust with a high voltage and collect the dust thus charged, a grounded metallic filter to adsorb the charged dust, a chemical substance-capturing filter to cause a chemical reaction in chemical components of the charged dust and thereby adsorb and remove the chemical components, and an activated carbon filter to adsorb airborne inorganic, organic substances or colloidal particles.

2. An air purifier for purifying dust-laden air comprising a casing having an air intake for introducing polluted air into the purifier and an air outlet for supplying purified air from the purifier, a blower in the casing for circulating air through the casing from the intake to the outlet, and a series of filters including a pre-filter to remove coarse dust, an electrostatic dust collector to impress the dust with a high voltage and collect the dust thus charged, a grounded metallic filter to adsorb the charged dust, a chemical substance-capturing filter to cause a chemical reaction in chemical components of the charged dust and thereby adsorb and remove the chemical components, and an activated carbon filter to adsorb airborne inorganic and organic substances and colloidal particles.

3. An air purifier as in claim 2 including a dust collection board separately provided on an air outflow side of the electrostatic dust collector, and a germicidal lamp constructed and arranged to irradiate the dust collection board with ultraviolet rays.

4. An air purifier as in claim 2 wherein the metallic filter consists of copper wool.

5. An air purifier as in claim 2 wherein the metallic filter consists of aluminum foil.

6. An air purifier as in claim 2 wherein the chemical substance-capturing filter comprises an ion-exchange resin filter.

7. An air purifier as in claim 6 wherein the ion-exchange resin filter is a molded product of a non-woven cloth impregnated with ion-exchange resin.

8. An air purifier as in claim 6 wherein the ion-exchange resin is in a fiber form and the fibers are bound together by a porous binder.

9. An air purifier as in claim 2 wherein the chemical substance-capturing filter comprises a catalyst filter.

10. An air purifier as in claim 9 wherein the catalyst filter includes a non-woven cloth impregnated with a blend of fine particles of heavy metal oxides activated through high temperature high tension discharge or by using calcium carbide.

References Cited

UNITED STATES PATENTS

| 2,709,954 | 6/1955 | Baker | 98—36 |
|---|---|---|---|
| 2,994,405 | 8/1961 | Barach et al. | 423—215.5 X |
| 3,172,747 | 3/1965 | Nodolf | 55—387 |
| 3,558,286 | 1/1971 | Goordine | 23—288 F |
| 3,745,750 | 7/1973 | Arff | 204—316 X |
| 3,744,216 | 7/1973 | Halloran | 21—74 R X |

FOREIGN PATENTS

| 183,768 | 8/1922 | Great Britain | 55—138 |
|---|---|---|---|
| Ad. 66,769 | 3/1957 | France | 55—131 |
| 4,598 | 1970 | Japan | 55—124 |

DENNIS E. TALBERT, Jr., Primary Examiner

U.S. Cl. X.R.

21—53, 74 A, Dig. 2; 23—260, 288 R; 55—6, 73, 102, 126, 131, 138, 276, 279, 316 387, 419, 472, Dig. 6; 423—215.5, 244, 246